(12) United States Patent
Poteet et al.

(10) Patent No.: US 11,472,749 B2
(45) Date of Patent: Oct. 18, 2022

(54) HIGH TEMPERATURE OXIDATION PROTECTION FOR COMPOSITES

(71) Applicant: GOODRICH CORPORATION, Charlotte, NC (US)

(72) Inventors: Steven A. Poteet, Hamden, CT (US); Katherine Urena Pimentel, Manchester, CT (US)

(73) Assignee: Goodrich Corporation, Charlotte, NC (US)

(*) Notice: Subject to any disclaimer, the term of this patent is extended or adjusted under 35 U.S.C. 154(b) by 0 days.

(21) Appl. No.: 16/590,170

(22) Filed: Oct. 1, 2019

(65) Prior Publication Data

US 2021/0094887 A1 Apr. 1, 2021

(51) Int. Cl.
| | |
|---|---|
| *C04B 41/45* | (2006.01) |
| *C04B 41/00* | (2006.01) |
| *C04B 41/50* | (2006.01) |
| *C04B 41/52* | (2006.01) |
| C04B 103/60 | (2006.01) |
| C04B 111/00 | (2006.01) |

(52) U.S. Cl.
CPC ...... *C04B 41/4543* (2013.01); *C04B 41/0072* (2013.01); *C04B 41/4549* (2013.01); *C04B 41/5006* (2013.01); *C04B 41/5023* (2013.01); *C04B 41/5024* (2013.01); *C04B 41/5058* (2013.01); *C04B 41/5059* (2013.01); *C04B 2103/608* (2013.01); *C04B 2111/00577* (2013.01)

(58) Field of Classification Search
CPC ........... C04B 41/4543; C04B 41/0072; C04B 41/4549; C04B 41/5006; C04B 41/5058
See application file for complete search history.

(56) References Cited

U.S. PATENT DOCUMENTS

| | | |
|---|---|---|
| 5,362,567 A | 11/1994 | Washburn et al. |
| 6,913,821 B2 | 7/2005 | Golecki et al. |
| 7,767,305 B1 | 8/2010 | Stewart et al. |
| 8,137,802 B1 | 3/2012 | Loehman et al. |
| 9,126,873 B2 | 9/2015 | Diss et al. |
| 10,377,675 B2 | 8/2019 | Mazany et al. |
| 2003/0194574 A1 | 10/2003 | Thebault |
| 2006/0141154 A1* | 6/2006 | Thebault ............ C04B 35/6264 427/249.2 |
| 2006/0147699 A1* | 7/2006 | Sarkar ................... C04B 35/119 428/323 |

(Continued)

FOREIGN PATENT DOCUMENTS

EP 3282038 2/2018

OTHER PUBLICATIONS

European Patent Office, European Search Report dated Oct. 27, 2020 in Application No. 19216273.3.

(Continued)

*Primary Examiner* — Alex B Efta
(74) *Attorney, Agent, or Firm* — Snell & Wilmer L.L.P.

(57) ABSTRACT

Systems and methods for forming an oxidation protection system on a composite structure are provided. In various embodiments, an oxidation protection system disposed on a substrate may comprise a boron-silicon-glass layer formed directly on the composite structure. The boron-silicon-glass layer may comprise a boron compound, a silicon compound, and a glass compound.

18 Claims, 5 Drawing Sheets

(56) References Cited

U.S. PATENT DOCUMENTS

| | | |
|---|---|---|
| 2007/0026153 A1 | 2/2007 | Nicolaus et al. |
| 2011/0311804 A1* | 12/2011 | Diss ........................ F02K 9/974 |
| | | 428/325 |
| 2017/0313627 A1* | 11/2017 | Shim ..................... C04B 35/563 |
| 2017/0369714 A1 | 12/2017 | Nicolaus et al. |
| 2018/0044537 A1* | 2/2018 | Poteet ................... C04B 41/524 |
| 2019/0233324 A1 | 8/2019 | Poteet et al. |

OTHER PUBLICATIONS

European Patent Office, European Partial Search Report dated Jul. 27, 2020 in Application No. 19216273.3.

\* cited by examiner

HIGH TEMPERATURE OXIDATION PROTECTION FOR COMPOSITES

FIELD

The present disclosure relates generally to composites and, more specifically, to oxidation protection systems for carbon-carbon composite structures.

BACKGROUND

Oxidation protection systems for carbon-carbon composites are typically designed to minimize loss of carbon material due to oxidation at operating conditions, which include temperatures of 900° C. (1652° F.) or higher. Phosphate-based oxidation protection systems may reduce infiltration of oxygen and oxidation catalysts into the composite structure. However, despite the use of such oxidation protection systems, significant oxidation of the carbon-carbon composites may still occur during operation of components such as, for example, aircraft braking systems. In addition, at such high operating temperatures, phosphate-based oxidation protection systems (OPS) applied to non-wear surfaces of brake disks may experience decreasing viscosity, which may cause the OPS to migrate away from non-wear surface edges proximate to a wear surface of the brake disk, leaving the composite material at or proximate to the non-wear surface edges vulnerable to oxidation. Oxidation protection system having coatings of boron carbide and silicon carbide applied via chemical vapor deposition (CVD) have demonstrated effective oxidation protection at high operating temperature. However, the CVD process increases manufacturing costs.

SUMMARY

A method for forming an oxidation protection system, on a composite structure is provided. In accordance with various embodiments, the method may comprise applying a boron-silicon-glass composite slurry to the composite structure, and heating the composite structure to a temperature sufficient to form a boron-silicon-glass layer on the composite structure. The boron-silicon-glass composite slurry may comprise a boron compound, a silicon compound, a glass compound, and a carrier fluid.

In various embodiments, the boron compound may comprise a boron carbide and the silicon compound may comprise silicon carbide. In various embodiments, the glass compound may comprise a borosilicate glass.

In various embodiments, the boron carbide may comprise a first group of boron carbide particles having a first average particle size and a second group of boron carbide particles having a second average particle size greater than the first average particle size. In various embodiments, the second group of boron carbide particles may form a greater weight percentage of the boron-silicon-glass composite slurry than the first group of boron carbide particles.

In various embodiments, an average particle size of a first group of silicon carbide particles of the silicon carbide may be less than an average particle size of a second group of silicon carbide particles of the silicon carbide. In various embodiments, the first group of silicon carbide particles may form a weight percentage of the boron-silicon-glass composite slurry that is greater than a weight percentage of the boron-silicon-glass composite slurry formed by the second group of silicon carbide particles.

In various embodiments, the boron compound may comprise at least one of titanium diboride, boron nitride, boron carbide, zirconium boride, silicon hexaboride, or elemental boron, and the silicon compound may comprises at least one of silicon carbide, silicon dioxide, a silicide compound, silicon, fumed silica, or silicon carbonitride. In various embodiments, the silicon compound may comprise silicon carbide particles having an average particle size of less than or equal to 1 micrometer. In various embodiments, the boron compound may comprise boron carbide particles having an average particle size of greater than or equal to 9.0 micrometers.

In various embodiments, heating the composite structure to the temperature sufficient to form the boron-silicon-glass layer on the composite structure may comprise heating the composite structure at a first temperature of about 300° Fahrenheit for between 10 minutes and 1.5 hours, and heating the composite structure at a second temperature of about 1650° Fahrenheit for between 1.5 hours and 2.5 hours.

In various embodiments, applying the boron-silicon-glass composite slurry to the composite structure comprises at least one of brushing or spraying. The boron-silicon-glass composite slurry may be applied directly on a surface of the composite structure.

An oxidation protection system disposed on an outer surface of a substrate is also disclosed herein. In accordance with various embodiments, the oxidation protection system may comprise a boron-silicon-glass layer disposed on the outer surface. The boron-silicon-glass layer may comprise a boron compound, a silicon compound, and a glass compound.

In various embodiments, the boron compound may comprise a first group of boron particles each having a first average particle size and a second group of boron particles each having a second average particle size greater than the first average particle size. In various embodiments, an average particle size of a first group of silicon carbide particles of the silicon compound may be less than an average particle size of a second group of silicon carbide particles of the silicon compound.

In various embodiments, the boron-silicon-glass layer may be formed in direct contact with the outer surface of the substrate. In various embodiments, the glass compound may comprise a borosilicate glass.

In various embodiments, the boron compound may comprise at least one of titanium diboride, boron nitride, boron carbide, zirconium boride, silicon hexaboride, or elemental boron, and the silicon compound may comprise at least one of silicon carbide, silicon dioxide, a silicide compound, silicon, fumed silica, or silicon carbonitride.

In accordance with various embodiments, a method for forming an oxidation protection system on a composite structure may comprise apply a boron slurry to the composite structure, performing a first low temperature bake by heating the composite structure at a first temperature, applying a silicon slurry to the composite structure, performing a second low temperature bake by heating the composite structure at a second temperature, and performing a high temperature heat treatment by heating the composite structure at a third temperature. The third temperature may be greater than the first temperature and the second temperature.

In various embodiments, the first temperature may be about 300° Fahrenheit, the second temperature may be about 300° Fahrenheit, and the third temperature may be about 1650° Fahrenheit.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1A:
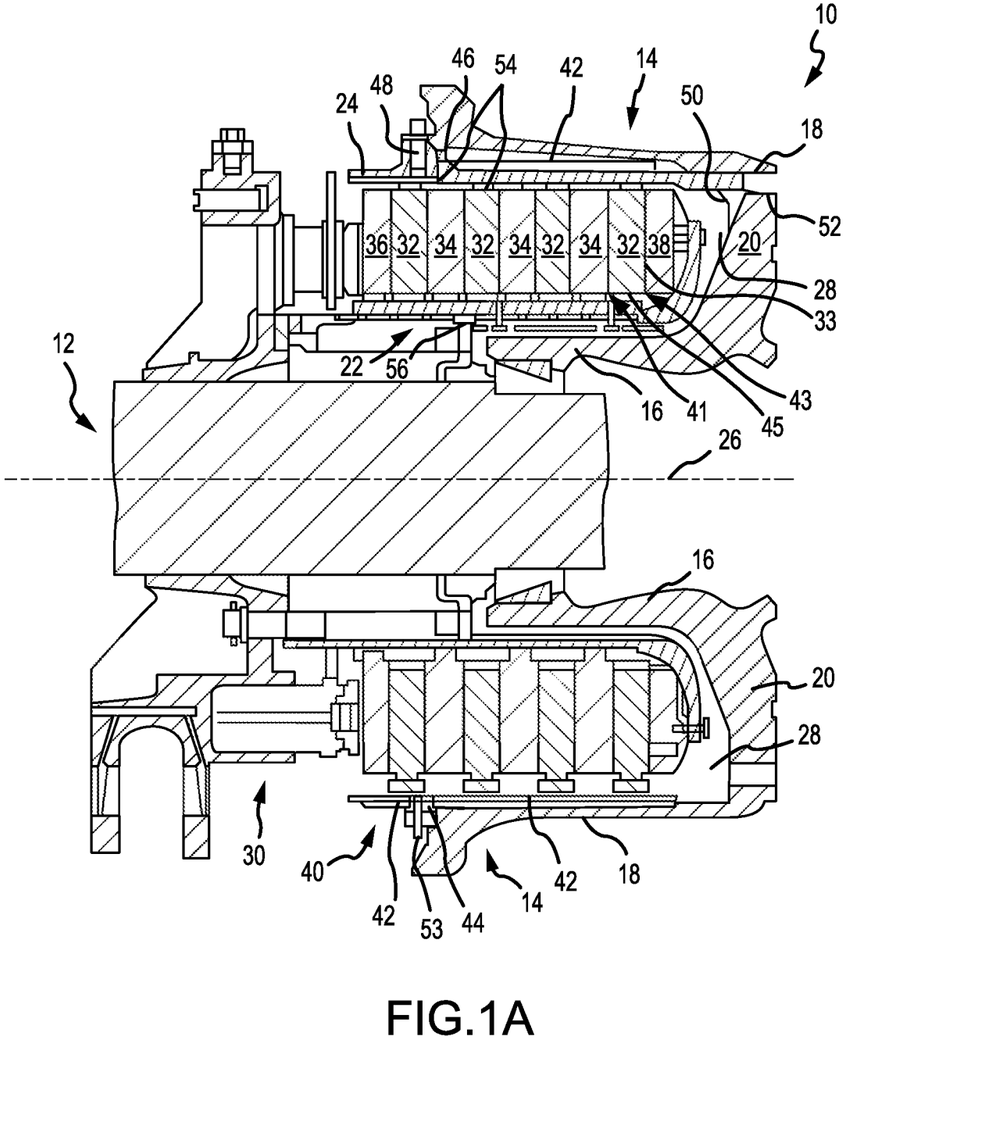
FIG. 1A illustrates a cross sectional view of an aircraft wheel braking assembly, in accordance with various embodiments.
Figure 1B:
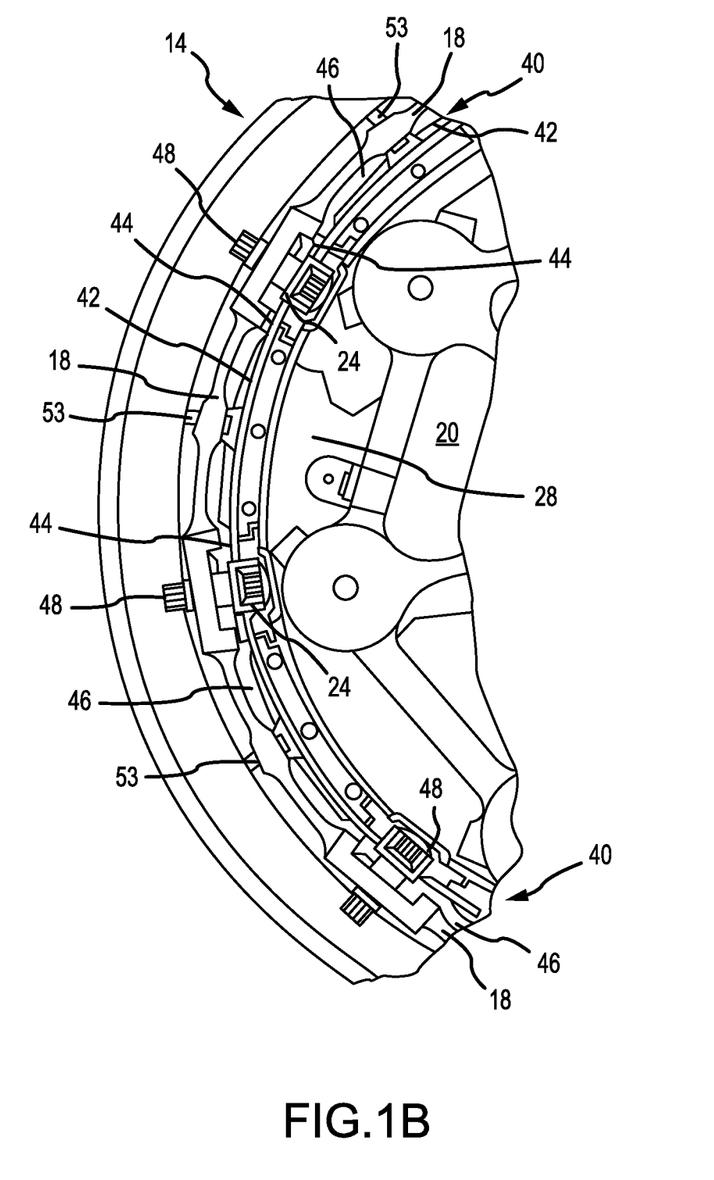
FIG. 1B illustrates a partial side view of an aircraft wheel braking assembly, in accordance with various embodiments.

With initial reference to FIGS. 1A and 1B, aircraft wheel braking assembly 10 such as may be found on an aircraft, in accordance with various embodiments is illustrated. Aircraft wheel braking assembly may, for example, comprise a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56. FIG. 1B illustrates a portion of aircraft wheel braking assembly 10 as viewed into wheel well 18 and wheel well recess 28.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. With reference to FIG. 1A, a portion of wheel well 18 and torque bar 24 is removed to better illustrate heat shield 40 and heat shield segments 42. With reference to FIG. 1B, heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

Under the operating conditions (e.g., high temperature) of aircraft wheel braking assembly 10, carbon-carbon composites may be prone to material loss from oxidation of the carbon. For example, various carbon-carbon composite components of aircraft wheel braking assembly 10 may experience both catalytic oxidation and inherent thermal oxidation caused by heating the composite during operation. In various embodiments, composite rotors 32 and stators 34 may be heated to sufficiently high temperatures that may oxidize the carbon surfaces exposed to air. At elevated temperatures, infiltration of air and contaminants may cause internal oxidation and weakening, especially in and around brake rotor lugs 54 or stator slots 56 securing the friction disks to the respective torque bar 24 and torque take-out assembly 22. Because carbon-carbon composite components of aircraft wheel braking assembly 10 may retain heat for a substantial time period after slowing the aircraft, oxygen from the ambient atmosphere may react with the carbon matrix and/or carbon fibers to accelerate material loss. Further, damage to brake components may be caused by the oxidation enlargement of cracks around fibers or enlargement of cracks in a reaction-formed porous barrier coating (e.g., a silicon-based barrier coating) applied to the carbon-carbon composite.

Elements identified in severely oxidized regions of carbon-carbon composite brake components include potassium (K) and sodium (Na). These alkali contaminants may come into contact with aircraft brakes as part of cleaning or de-icing materials. Other sources include salt deposits left from seawater or sea spray. These and other contaminants (e.g. Ca, Fe, etc.) can penetrate and leave deposits in pores of carbon-carbon composite aircraft brakes, including the substrate and any reaction-formed porous barrier coating. When such contamination occurs, the rate of carbon loss by oxidation can be increased by one to two orders of magnitude.

In various embodiments, brake disks of aircraft wheel braking assembly 10 may reach operating temperatures in the range from about 100° C. (212° F.) up to about 900° C. (1652° F.), or higher (e.g., 1093° C. (2000° F.). However, it will be recognized that the oxidation protection systems compositions and methods of the present disclosure may be readily adapted to many parts in this and other braking assemblies, as well as to other carbon-carbon composite structures susceptible to oxidation losses from infiltration of atmospheric oxygen and/or catalytic contaminants.

Figure 2:
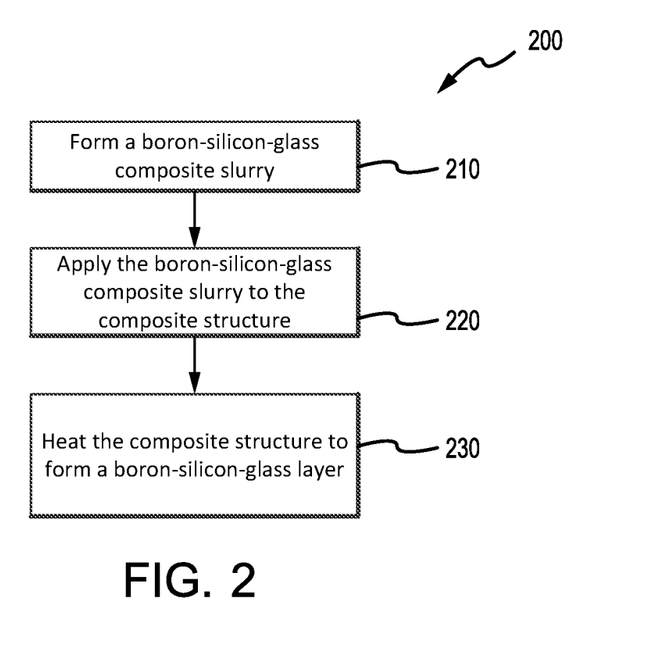
FIG. 2 illustrates a method for forming an oxidation protection system on a composite structure, in accordance with various embodiments.

In various embodiments, a method for limiting an oxidation reaction in a substrate (e.g., a composite structure) may comprise forming an oxidation protection system on the composite structure. With reference to FIG. 2A, a method 200 for forming an oxidation protection system on composite structure is illustrated. In accordance with various embodiments, method 200 may, for example, comprise applying an oxidation inhibiting composition to non-wearing surfaces of carbon-carbon composite brake components, such as non-wear surfaces 45 and/or lugs 54. Non-wear surface 45, as labeled in FIG. 1A, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including slots 56, as well as outer diameter (OD) surfaces of rotors 32 including lugs 54. The oxidation inhibiting composition of method 200 may be applied to preselected regions of a carbon-carbon composite structure that may be otherwise susceptible to oxidation. For example, aircraft brake disks may have the oxidation inhibiting composition applied on or proximate stator slots 56, rotor lugs 54, and/or non-wear surface 45. Method 200 may be performed on a densified a carbon-carbon composite. In this regard, method 200 may be performed after carbonization and densification of the carbon-carbon composite.

In various embodiments, method 200 may comprise forming a boron-silicon-glass composite slurry (step 210) by combining a boron compound, a silicon compound, and a glass compound with a carrier fluid (such as, for example, water). In various embodiments, the boron compound may comprise at least one boron-comprising refractory material (e.g., ceramic materials). In various embodiments, the boron compound may comprise titanium diboride, boron nitride, boron carbide, zirconium boride, silicon hexaboride, and/or elemental boron.

The weight percentage of the boron compound within the boron-silicon-glass composite slurry may be any suitable weight percentage for the desired application. In various embodiments, the boron-silicon-glass composite slurry may comprise from 5% to 50% by weight boron compound, from 10% to 40% by weight boron compound, from 20% to 30% by weight boron compound, from 20% to 25% by weight boron compound, and/or about 21.2% by weight boron compound, about 22.5% by weight boron compound, and/or about 24.1% by weight boron compound. As used in this context only, the term "about" means plus or minus 1 weight percent.

In various embodiments, the boron compound may comprise boron powder (e.g., boron carbide powder). The boron compound comprises particles having an average particle size between 100 nanometers (nm) and 100 micrometers (μm) (between $3.9\times10^{-6}$ inch and 0.0039 inch), between 500 nm and 100 μm (between $2\times10^{-5}$ inch and 0.0039 inch), between 500 nm and 1 μm (between $2\times10^{-5}$ inch and $3.9\times10^{-5}$ inch), between 1 μm and 50 μm (between $3.9\times10^{-5}$ inch and 0.002 inch), between 1 μm and 20 μm (between $3.9\times10^{-5}$ inch and 0.0008 inch), and/or between 1 μm and 10 μm (between $3.9\times10^{-5}$ inch and 0.0004 inch), about 0.7 μm ($2.8\times10^{-5}$ inch), about 9.3 μm (0.0004 inch), and/or about 50 μm (0.0020 inches). As used in this context only, the term "about" means plus or minus ten percent of the associated value.

In various embodiments, the boron compound may comprise particles of varying size. In various embodiments, the boron compound comprises a first group of particles having a first average particle size and a second group of particles having a second average particle size greater than the first average particle size.

In various embodiments, the particles of the first group may have an average particle size between 100 nm and 20 μm (between $3.9\times10^{-6}$ inch and 0.0008 inch), between 500 nm and 10 μm (between $2\times10^{-5}$ inch and 0.0004 inch), between 500 nm and 1.0 μm ($2\times10^{-5}$ inch and $3.9\times10^{-5}$ inch), and/or about 0.7 μm ($2.8\times10^{-5}$ inch). As used in this context only, the term "about" means plus or minus ten percent of the associated value.

In various embodiments, the particles of the second group may have an average particle size between 500 nm and 60 μm ($2\times10^{-5}$ inch and 0.0008 inch), 1 μm and 15 μm (between $2\times10^{-5}$ and 0.0006 inch), between 8 μm and 10.0 μm (between 0.0003 inch and 0.0008 inch), between 45 μm and 55 μm (between 0.0018 inch and 0.0022 inch), about 50 μm (0.0020 inch), and/or about 9.3 μm (0.00039 inch). As used in this context only, the term "about" means plus or minus ten percent of the associated value.

In various embodiments, the boron compound particles of the second average particle size form a larger weight percentage of the boron-silicon-glass composite slurry as compared to the weight percentage formed by the boron compound particles of the first average size. In various embodiments, the boron-silicon-glass composite slurry may comprise from 0% to 20% by weight the boron compound first average particle size, 5% to 8% by weight the boron compound first average particle size, about 6.36% by weight the first boron compound average particle size, and/or about 7.24% by weight the first boron compound average particle size. As used in this context only, the term "about" means plus or minus 0.5% weight percent. In various embodiments, the boron-silicon-glass composite slurry may comprise from 5% to 30% by weight the second boron compound average particle size, 10% to 25% by weight the second boron compound average particle size, 14% to 23% by weight the second boron compound average particle size, about 16.9% by weight the second boron compound average particle size, about 21.2% by weight the second boron compound average particle size, and/or about 22.6% by weight the second boron compound average particle size. As used in this context only, the term "about" means plus or minus 0.5% weight percent.

In various embodiments, the silicon compound may comprise silicon carbide, a silicide compound, silicon, or silicon carbonitride. The weight percentage of the silicon compound within the boron-silicon-glass composite slurry may be any suitable weight percentage for the desired application. In various embodiments, the boron-silicon-glass composite slurry may comprise from 10% to 40% by weight silicon compound, from 20% to 35% by weight silicon compound, from 27% to 32% by weight silicon compound, about 27.3% by weight silicon compound, about 31% by weight silicon compound, and/or about 31% by weight silicon compound. As used in this context only, the term "about" means plus or minus 2 weight percent.

In various embodiments, the silicon compound may comprise a silicon powder (e.g., silicon carbide powder). The silicon compound comprises particles, the silicon compound average particle size may be between 100 nm and 50 μm (between $3.9 \times 10^{-6}$ inch and 0.0039 inch), between 500 nm and 20 μm (between $2 \times 10^{-5}$ inch and 0.0039 inch), between 500 nm and 1.5 μm (between $2 \times 10^{-5}$ inch and $3.9 \times 10^{-5}$ inch), between 15 μm and 20 μm (between $3.9 \times 10^{-5}$ inch and 0.002 inch), about 17 μm (0.0007 inch), and/or about 1.0 μm ($4 \times 10^{-5}$ inch). As used in this context only, the term "about" means plus or minus ten percent of the associated value.

In various embodiments, the silicon compound may comprise silicon compound particles of varying size. In various embodiments, the silicon compound comprises a first group of silicon compound particles having a first average particle size and a second group of silicon compound particles having a second average particle size. The first silicon compound average particle size may be less than the second silicon compound average particle size.

In various embodiments, the silicon compound particles of the first group have an average particle size between 100 nm and 20 μm (between $3.9 \times 10^{-6}$ inch and 0.0008 inch), 500 nm and 10 μm (between $2 \times 10^{-5}$ and 0.0004 inch); between 500 nm and 1.5 μm (between $2 \times 10^{-5}$ and $6 \times 10^{-5}$), and/or about 1.0 μm ($4 \times 10^{-5}$ inch). In various embodiments, the silicon compound particles of the second group may have an average particle size between 1 μm and 50 μm (between $4 \times 10^{-5}$ inch and 0.002 inch), between 5 μm and 25 μm (between 0.0002 inch and 0.001), between 16 μm and 18 μm (between 0.0006 inch and 0.0007 inch), and/or about 17 μm (0.00067 inches). As used in this context only, the term "about" means plus or minus ten percent of the associated value.

In various embodiments, the silicon compound particles of the first average particle size form a larger weight percentage of the boron-silicon-glass composite slurry as compared to the weight percentage formed by the silicon compound particles of the second average particle size. In various embodiments, the boron-silicon-glass composite slurry may comprise from 0% to 30% by weight the second silicon compound average particle size, 0% to 25% by weight the second silicon compound average particle size, about 9.3% by weight the second silicon compound average particle size, and/or about 21.7% by weight the second silicon compound average particle size. As used in this context only, the term "about" means plus or minus 1% weight percent. In various embodiments, the boron-silicon-glass composite slurry may comprise from 5% to 40% by weight the first silicon compound average particle size, 10% to 35% by weight the first silicon compound average particle size, 20% to 30% by weight the first silicon compound average particle size, about 21.7% by weight the second silicon compound average particle size, about 27.2% by weight the second silicon compound average particle size, and/or about 29.0% by weight the second silicon compound average particle size. As used in this context only, the term "about" means plus or minus 1% weight percent.

In various embodiments, the glass compound is a borosilicate glass composition in the form of a glass frit, powder, or other suitable pulverized form. In various embodiments, the borosilicate glass composition may comprise silicon dioxide ($SiO_2$), boron trioxide ($B_2O_3$), and/or aluminum oxide ($Al_2O_3$). The borosilicate glass composition may comprise in weight percentage of 13% $B_2O_3$, 61% $SiO_2$, 2% $Al_2O_3$, and 4% $Na_2O$, and may have a coefficient of thermal expansion (CTE) of $3.3 \times 10^{-6}$ cm/Cm, a working point of 2286° F. (1252° C.), and an annealing point of 1040° F. (560° C.). In various embodiments, the glass compound may comprise a lithia potash borosilicate glass composition in the form of a glass frit, powder, or other suitable pulverized form and having a CTE of $3.0 \times 10^{-6}$ cm/Cm, a working point of 1954° F. (1068° C.), and an annealing temperature of 925° F. (496° C.). In various embodiments, the glass compound may comprise borophosphates, a borosilicate composition including in weight percentage, 96% $SiO_2$ and 4% $B_2O_3$ (which is available under the trade name VYCOR® from Corning Incorporated of Corning, N.Y., USA), quartz, aluminosilicate, boroaluminosilicate, and/or any other suitable glass compound, which may be in the form of a glass frit, powder, or other suitable pulverized form.

The weight percentage of the glass compound within the boron-silicon-glass composite slurry may be any suitable weight percentage for the desired application. In various embodiments, the boron-silicon-glass composite slurry may comprise from 1% to 35% by weight glass compound, from 5% to 25% by weight glass compound, from 5% to 8% by weight glass compound, from 5% to 8% by weight glass compound, from 11% to 13% by weight glass compound, from 17.5% to 19% by weight glass compound, about 6.9% by weight glass compound, about 12.9% by weight glass compound, and/or about 18.2% by weight glass compound. As used in this context only, the term "about" means plus or minus 0.5 weight percent.

In various embodiments, the glass compound comprises particles, the average particle size may be between 500 nm and 50 μm (between $3.9 \times 10^{-6}$ inch and 0.0039 inch), between 5 μm and 25 μm (between $2 \times 10^{-5}$ inch and 0.0039 inch), between 10 μm and 15 μm (between $2 \times 10^{-5}$ inch and $3.9 \times 10^{-5}$ inch), between 11.5 μm and 13 μm (between $3.9 \times 10^{-5}$ inch and 0.002 inch), and/or between about 12.3 μm (0.0004 inch). As used in this context only, the term "about" means plus or minus 0.5 weight percent.

The remaining weight percent of the boron-silicon-glass composite slurry other than the boron compound, the silicon compound, and the glass may comprise the carrier fluid and/or any other suitable additives. In various embodiments, the boron-silicon-glass composite slurry consists of boron carbide, silicon carbide, borosilicate glass, and water. In various embodiments, the boron-silicon-glass composite slurry may be substantially free of phosphate. In this case, "substantially free" means less than 0.01 percent by weight of the boron-silicon-glass composite slurry.

In various embodiments, the boron slurry may comprise about 7.241% by weight boron carbide having an average particle size of about 0.7 μm ($2.8 \times 10^{-5}$ inch), about 16.897% by weight boron carbide having an average particle size of about 9.3 μm (0.0004 inch), about 9.310% by weight silicon carbide having an average particle size of about 17 μm (0.0007 inch), about 21.724% by weight silicon carbide having an average particle size of about 1 μm ($4 \times 10^{-5}$ inch), about 6.897% by weight borosilicate glass having an average particle size of about 12.3 μm (0.0005 inch), and about 37.931% by weight water; the borosilicate glass being comprised, in weight percentage of the borosilicate glass, of about 13% $B_2O_3$, about 61% $SiO_2$, about 2% $Al_2O_3$, and about 4% $Na_2O$. As used in this context only, the term "about" plus or minus ten percent of the associated value.

In various embodiments, method 200 further comprises applying the boron-silicon-glass composite slurry to a composite structure (step 220). Applying the boron-silicon-glass composite slurry may comprise, for example, spraying or brushing the boron-silicon-glass composite slurry to an outer surface of the composite structure. Embodiments in which the carrier fluid for the boron-silicon-glass composite slurry is water causes the aqueous boron-silicon-glass composite slurry to be more suitable for spraying or brushing application processes. In various embodiments, the application of the boron-silicon-glass composite slurry to the composite structure may not comprise chemical vapor deposition (CVD), thus saving the significant monetary expense associated with CVD. Any suitable manner of applying the boron-silicon-glass composite slurry to the composite structure is within the scope of the present disclosure, except in various embodiments, CVD. As referenced herein, the composite structure may refer to a carbon-carbon composite structure. In accordance with various embodiments, the boron-silicon-glass composite slurry may be applied directly on (i.e., in physical contact with) the surface of the composite structure. In this regard, method 200 generally does not include a pretreating composition and/or a pretreating step and/or forming a sealing layer prior to applying the boron-silicon-glass composite slurry, as may be associated with other oxidation protection systems, for example, oxidation protection systems comprising phosphate glass layers.

In various embodiments, method 200 may further comprise a step 230 of heating the composite structure to form a boron-silicon-glass layer on the composite structure. In various embodiments, the boron-silicon-glass layer may be formed directly adjacent to the composite structure. The heating of the composite structure may remove the carrier fluid from the boron-silicon-glass composite slurry to form the boron-silicon-glass layer.

In various embodiments, step 230 may comprise heating the composite structure at a first, lower temperature followed by heating the composite structure at a second, higher temperature. For example, in various embodiments, the composite structure may undergo a first heat treatment at a first temperature of about 250° F. (121° C.) to about 350° F. (177° C.) followed by a second heat treatment at a second temperature of about 1600° F. (871° C.) to about 1700° F. (927° C.). In various embodiments, the first temperature may be about 300° F. (149° C.), and the second temperature may about 1650° F. (899° C.). As used in this context only, the term "about" means plus or minus 25° F. (4° C.). In various embodiment, the second temperature is selected to be below the working point of the glass compound, for example, below the working point of the borosilicate glass in the boron-silicon-glass composite slurry.

Further, step 230 may be performed in an inert environment, such as under a blanket of inert or less reactive gas (e.g., nitrogen ($N_2$), argon, other noble gases, and the like). The composite structure may be heated prior to application of the boron-silicon-glass composite slurry to aid in the penetration of the boron-silicon-glass composite slurry. The temperature rise may be controlled at a rate that removes water without boiling and provides temperature uniformity throughout the composite structure.

Step 230 may, for example, comprise heating the composite structure at the first temperature for a period between about 5 minutes to 8 hours, about 10 minutes to 2 hours, about 10 minutes, and/or about 1 hour, wherein the term "about" in this context only means plus or minus ten percent of the associated value. Step 230 may, for example, comprise heating the composite structure at the second temperature for a period between about 5 minutes to 8 hours, about 0.5 hours to 4 hours, about 1.5 hours to about 2.5 hours, and/or about 2 hours, wherein the term "about" in this context only means plus or minus ten percent of the associated value. In various embodiments, step 230 may be the final step, as method 200 generally does not include a sealing layer step, as may be associated with other oxidation protection systems, for example, oxidation protection systems comprising phosphate glass layers. In this regard, the boron-silicon-glass layer may form an exterior surface of the oxidation protection system. Stated differently, the boron-silicon-glass layer extends from the surface of the composite substrate to the exterior surface of oxidation protection system.

With additional reference to FIG. 1, wear surfaces, such as wear surface 33, of brake disks may reach extremely high temperatures during operation (temperatures in excess of 1093° C. (2000° F.)). At such extreme temperatures of wear surfaces, the oxidation protection systems on non-wear surfaces adjacent to the wear surface (e.g., non-wear surface 45 adjacent to wear surface 33) may experience heating. As used herein, a "wear" surface refers to a surface of a friction disk that physically contacts an adjacent friction disk surface. As used herein, a "non-wear" surface refers to a surface of a friction disk that does not physically contact the surface of an adjacent friction disk. Oxidation protection systems comprising a phosphate glass disposed on non-wear surface 45 (such as that represented by data set 300 in FIG. 3, discussed herein) may increase temperature to a point at which the viscosity decreases and causes beading and/or migration of the oxidation protection system layers proximate edges 41, 43 away from edges 41, 43 and the adjacent wear surfaces (e.g., wear surface 33). Edges 41, 43 and wear surface 33, as labeled in FIG. 1A, simply reference exemplary edges and an exemplary wear surface, respectively, on a brake disk, but edges similar to edges 41, 43 and wear surfaces similar to wear surface 33 may be present on any brake disks (e.g., rotors 32, stators 34, pressure plate 36, end plate 38, or the like).). Thus, composite material on non-wear surface 45 proximate edges 41, 43 may be vulnerable to oxidation because of such migration. Additionally, the extreme temperatures during the operation of brake disks may cause cracks within an oxidation protection system, allowing oxygen to reach the material of the composite structure, causing oxidation and material loss.

During operation, at elevated temperatures (e.g., around 1700° F. (927° C.) or 1800° F. (982° C.)), oxygen may diffuse through, or travel through cracks in the boron-silicon-glass layer of the oxidation protection system and oxidize the boron compound in the boron-silicon-glass layer into boron trioxide ($B_2O_3$). In various embodiments, in response to temperatures elevating to a sufficient level (e.g., around 1700° F. (927° C.) or 1800° F. (982° C.)), the boron compound in the boron-silicon-glass layer may be oxidized into boron trioxide, and the silicon compound may react (e.g., oxidize) to form silica. The silica may react with the boron trioxide to form borosilicate glass. During operating an lower temperatures (e.g., below 1700° F. (927° C.)), the silicon compound in the boron-silicon-glass layer may comprise silicon carbide, as the silicon-compound may not oxidize under such conditions to form the silica to react with the boron trioxide.

The borosilicate glass may be formed in the cracks of the boron-silicon-glass layer. Therefore, the oxidation protection systems described herein have self-healing properties to protect against cracks formed in the layers of the oxidation protection systems, preventing or mitigating against oxygen penetration and the resulting oxidation and loss of material. Additionally, borosilicate glass has a high viscosity (a working point of about 1160° C. (2120° F.), wherein "about" means plus or minus 100° C. (212° F.), and the working point is the point at which a glass is sufficiently soft for the shaping of the glass). Thus, the high temperatures experienced by edges 41, 43 in their proximity to wear surface 33 may cause minimal, if any, migration of the oxidation protection systems described herein.

Exposure of the boron-silicon-glass layer to moisture after exposure to increased temperatures (e.g., temperatures greater than 1700° F. (927° C.)), may lead to increased boric acid formation. Boron-silicon-glass layers having larger average particle size boron carbide and smaller average particle size silicon carbide may reduce formation of boric acid by limiting free boron trioxide by reducing the reaction surface area of boron carbide and increasing the reaction surface area of silicon carbide. In various embodiments, the boron-silicon-glass layer may be formed by forming and applying a boron-silicon-glass composite slurry (steps 210 and 220) comprised of about 22.581% by weight boron carbide having an average particle size of about 9.3 μm (0.0004 inch), about 29.032% by weight silicon carbide having an average particle size of about 1 μm ($4\times10^{-5}$ inch), about 12.903% by weight borosilicate glass having an average particle size of about 12.3 μm (0.0005 inch), and about 35.484% by weight water; the borosilicate glass being comprised, in weight percentage of the borosilicate glass, of about 13% $B_2O_3$, about 61% $SiO_2$, about 2% $Al_2O_3$, and about 4% $Na_2O$. As used in this context only, the term "about" plus or minus ten percent of the associated value.

With the oxidation protection systems and methods disclosed herein comprising a boron-silicon-glass layer disposed on a composite structure, the boron compound, the silicon compound, and/or the glass compound in the boron-silicon-glass layer may prevent, or decrease the risk of, the oxidation protection system migrating from edges of non-wear surfaces adjacent to wear surfaces of composite structures, and additionally give the oxidation protection system self-healing properties to mitigate against oxidation caused by cracks in the oxidation protection system layers. The described boron-silicon-glass layer tends to provide a barrier layer on the non-wear surface at low temperatures (e.g., temperatures below 1700° F. (927° C.)) and form borosilicate glass at high temperatures (temperature above 1700° F. (927° C.)). Thus, the oxidation systems and methods described herein may prevent, or decrease the risk of, the oxidation protection system losing material resulting from such oxidation.

TABLE 1 illustrates two slurries comprising an oxidation protection composition (e.g., a boron-silicon-glass composite slurry described herein) prepared in accordance with various embodiments. Each numerical value in TABLE 1 is the number of grams of the particular substance added to the slurry.

TABLE 1

| Example >> | A | B |
| --- | --- | --- |
| Boron Carbide ($B_4C$) 0.7 μm | 10.50 | 10.50 |
| Boron Carbide ($B_4C$) 9.3 μm | 24.50 | 24.50 |
| $H_2O$ | 55.0 | 55.0 |
| BSG 7740 | 10.0 | 10.0 |
| Silicon Carbine (SiC) 17.0 μm | 45.0 | 31.50 |
| Silicon Carbine (SiC) 1.0 μm | 0.0 | 13.5 |
| Total (g) | 145.0 | 145.0 |
| Weight % solids | 62.07% | 62.07% |

As illustrated in TABLE 1, oxidation protection systems comprising a boron-silicon-glass composite slurry, which included a composition of boron carbide, borosilicate glass comprising 13% $B_2O_3$, 61% $SiO_2$, 2% $Al_2O_3$, and 4% $Na_2O$ weight percent of the borosilicate glass, and silicon carbide were prepared.

TABLE 2 illustrates two slurries, which may be applied separately from one another to form an oxidation protection system having a base layer comprising a phosphate glass. Each numerical value in TABLE 2 is the number of grams of the particular substance added to the slurry.

TABLE 2

| Example >> | D | E |
| --- | --- | --- |
| h-Boron nitride powder | 0 | 8.25 |
| Graphene nanoplatelets | 0 | 0.15 |
| $H_2O$ | 52.40 | 60.00 |
| Surfynol 465 surfactant | 0 | 0.20 |
| Ammonium dihydrogen phosphate (ADHP) | 11.33 | 0 |
| Glass frit | 34.00 | 26.5 |
| Aluminum orthophosphate (o-$AlPO_4$) | 2.270 | 0 |
| Acid Aluminum Phosphate (AALP) 1:2.5 | 0 | 5.0 |

As illustrated in TABLE 2, oxidation protection system slurries comprising a base layer slurry composition, which included phosphate glass composition glass frit and various additives such as h-boron nitride, graphene nanoplatelets, acid aluminum phosphate, aluminum orthophosphate, a surfactant, a flow modifier such as, for example, polyvinyl alcohol, polyacrylate or similar polymer, ammonium dihydrogen phosphate, and/or ammonium hydroxide, in a carrier fluid (i.e., water) were prepared. Slurry E is applied prior to slurry D and forms a phosphate glass base layer. Slurry D may be a phosphate glass, which serves as a sealing layer. After applying slurry D and E, the composite is heated to 1650° F. (899° C.) for two hours.

TABLE 3

| Example >> | F | G |
| --- | --- | --- |
| Monoaluminum Phosphate (MALP) sol'n | 60 | 75 |
| Phosphoric Acid | 20 | 25 |
| $H_2O$ | 19 | 0 |
| BYK-346 surfactant | 1 | 0 |
| Silicon Carbide | 0 | 0 |
| Boron Carbide | 0 | 0 |

TABLE 3 illustrates two slurries, which may be applied separately from one another on top of CVD formed boron carbide layer two to five microns thick and a CVD formed silicon carbide layer 90 to 120 microns thick to form an oxidation protection system having a phosphate glass sealing layer. Each numerical value in TABLE 3 is the number of grams of the particular substance added to the slurry. Slurry F comprises monoaluminum phosphate and phosphoric acid, along with water and a surfactant (to form a first sealing layer F after heating), and slurry G is an exemplary second sealing slurry comprising monoaluminum phosphate and phosphoric acid (to form a second sealing layer G after heating). The MALP solution used was 50% by weight monoaluminum phosphate and 50% by weight water.

Figure 3:
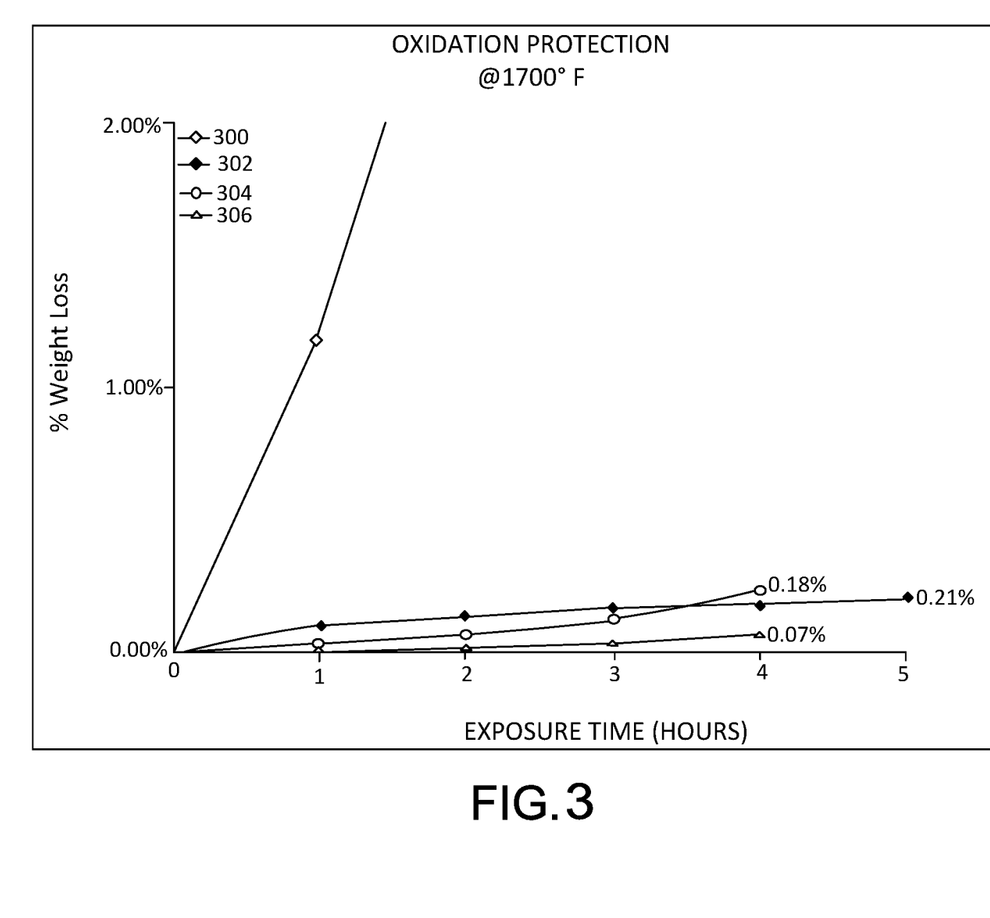
FIG. 3 illustrates experimental data obtained from testing various oxidation protection systems, in accordance with various embodiments.

TABLE 1, TABLE 2, TABLE 3 and FIG. 3 may allow evaluation of an oxidation protection system comprising a boron-silicon-glass layer formed using a boron-silicon-glass composite slurry, as described herein versus an oxidation protection system including phosphate glass base layer and formed using multiply distinct slurries and versus an oxidation protection system including a phosphate sealing layer and formed using CVD. Percent weight loss is shown on the y axis and exposure time is shown on the x axis of the graph depicted in FIG. 3.

For preparing the oxidation protection system comprising slurry A, the performance of which is reflected by data set 304, slurry A was applied to a 50-gram first carbon-carbon composite structure coupon and cured in inert atmosphere under heat at 300° F. (149° C.) for 1 hours and under heat at 1650° F. (899° C.) for two hours.

For preparing the oxidation protection system comprising slurry B, the performance of which is reflected by data set 306, slurry B was applied to a 50-gram first carbon-carbon composite structure coupon and cured in inert atmosphere under heat at 300° F. (149° C.) for 1 hours and under heat at 1650° F. (899° C.) for two hours.

For preparing the oxidation protection system having a phosphate glass base layer, the performance of which is reflected by data set 300, slurry E was applied to a 50-gram first carbon-carbon composite structure coupon and cured in inert atmosphere under heat at 899° C. (1650° F.) to form a base layer. After cooling, slurry D was applied atop the cured base layer and the coupons were fired again in an inert atmosphere.

For preparing the oxidation protection system comprising CVD formed layers, the performance of which is reflected by data set 302, a boron carbide layer two to five microns thick was formed on a 50-gram second carbon-carbon composite structure coupon using CVD, a silicon carbide layer 90 to 120 microns thick was formed on the boron carbide layer using CVD. Slurry F was applied atop the silicon layer and the composite was baked for one hour at 300° F. (149° C.). Slurry G was then applied and the composite was baked for one hour at 300° F. (149°). The composite was then baked for two hours at 718° C. (1324° F.) to form a sealing layer F/G.

After cooling, the coupons were subjected to isothermal oxidation testing at 1700° F. (927° C.) over a period of hours while monitoring mass loss As can be seen in FIG. 3, the oxidation protection systems formed using a boron-silicon-glass composite slurry, reflected by data sets 304 and 306 resulted in approximately 200 times less weight loss of the composite structure, as compared to the oxidation protection system represented by data set 300 demonstrated weight loss of the composite structure that was similar to, or less than as demonstrated by data set 306, that of the CVD applied oxidation protection system, represented by data set 302. Table 3 indicates that the oxidation protection systems formed using a boron-silicon-glass composite slurry may be more effective at oxidation protection than oxidation protection systems comprising phosphate glass base layer and formed using multiple slurries and almost equally and/or more effective than oxidation protection systems having similar layers formed using CVD.

Figure 4:
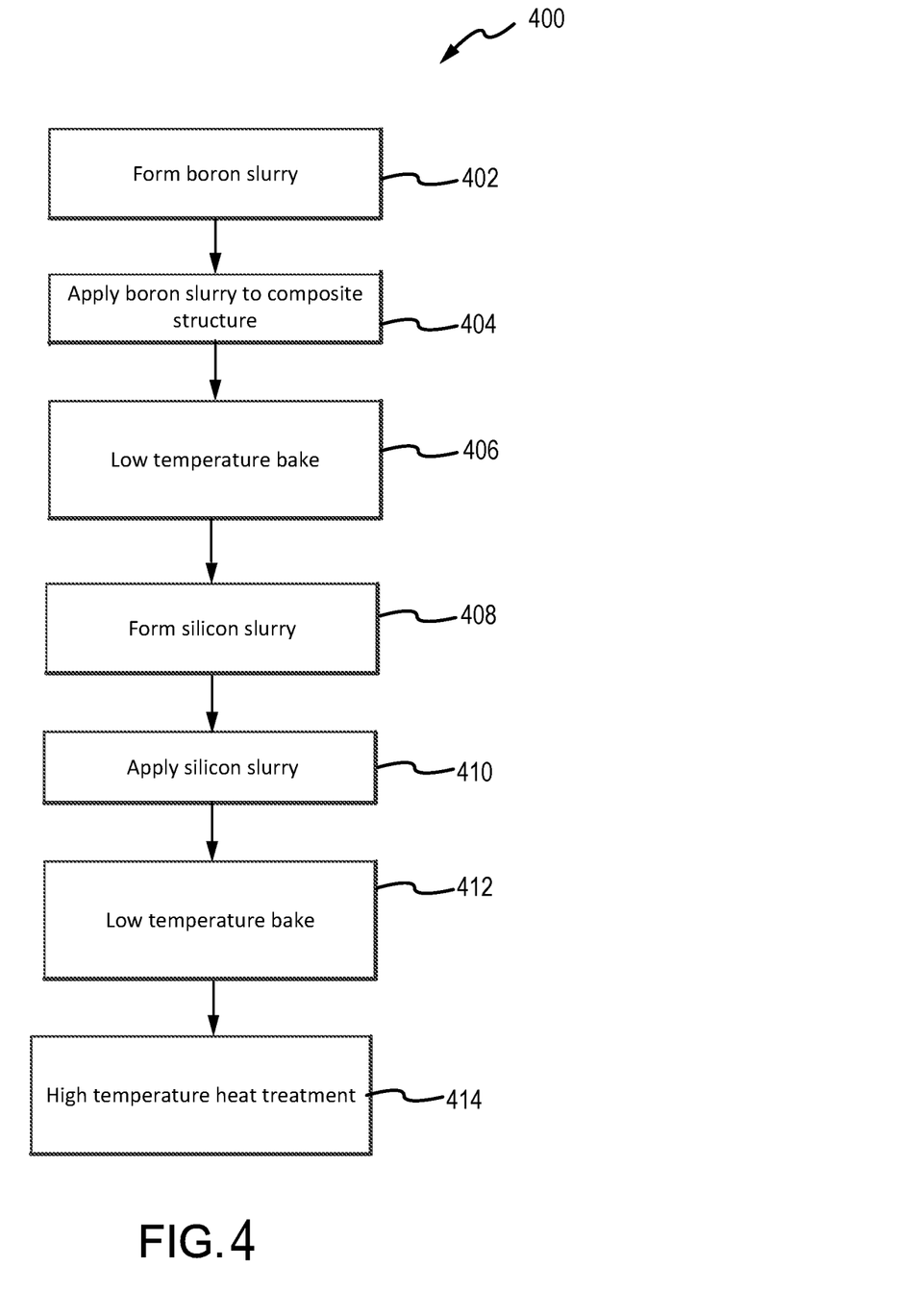
FIG. 4 illustrates a method for forming an oxidation protection system on a composite structure, in accordance with various embodiments.

With reference to FIG. 4, a method 400 for forming an oxidation protection system on composite structure is illustrated. In accordance with various embodiments, method 400 may, for example, comprise applying an oxidation inhibiting composition to non-wearing surfaces of carbon-carbon composite brake components, such as non-wear surfaces 45 and/or lugs 54. Non-wear surface 45, as labeled in FIG. 1A, simply references an exemplary non-wear surface on a brake disk, but non-wear surfaces similar to non-wear surface 45 may be present on any brake disks (e.g., rotors 32, stators 34, pressure plate 36, end plate 38, or the like). In various embodiments, method 200 may be used on the back face of pressure plate 36 and/or end plate 38, an inner diameter (ID) surface of stators 34 including slots 56, as well as outer diameter (OD) surfaces of rotors 32 including lugs 54. The oxidation inhibiting composition of method 400 may be applied to preselected regions of a carbon-carbon composite structure that may be otherwise susceptible to oxidation. For example, aircraft brake disks may have the oxidation inhibiting composition applied on or proximate stator slots 56, rotor lugs 54, and/or non-wear surface 45. Method 400 may be performed on densified carbon-carbon composites. In this regard, method 400 may be performed after carbonization and densification of the carbon-carbon composite.

In various embodiments, method 400 may comprise forming a boron slurry (step 402) by combining a boron compound and a glass compound with a carrier fluid (such as, for example, water). In various embodiments, the boron compound may comprise at least one boron-comprising refractory material (e.g., ceramic materials). In various embodiments, the boron compound may comprise titanium diboride, boron nitride, boron carbide, zirconium boride, silicon hexaboride, and/or elemental boron. In various embodiments, the glass compound may comprise a borosilicate glass.

Not to be bound by theory, it is presumed that boron components may become oxidized during service at high temperatures (e.g., temperatures greater than 1300° F. (704° C.)). The boron trioxide may then come into contact with oxidized silicon components to form a borosilicate in situ, providing a method of self-healing. For a boron-silicon oxidation protection system, the probability of boron trioxide reacting with oxidized silicon compounds is kinetically controlled and is influenced by the amount of components, surface area, aspect ratio, etc. Boron trioxide is also volatile, especially when hydrated to form boric acid, and may be lost during extended service time. Method 400 increases the probability of self-healing borosilicate formation by creating a layer of silicon compound by which boron trioxide must transport through prior to volatilization, reducing the dependence on aspect ratio and total amount of components in the slurry.

The weight percentage of the boron compound within the boron slurry may be any suitable weight percentage for the desired application. In various embodiments, the boron-silicon-glass composite slurry may comprise from 5% to 50% by weight boron compound, from 15% to 40% by weight boron compound, from 30% to 40% by weight boron compound, and/or about 35% by weight boron compound. As used in this context only, the term "about" means plus or minus 1 weight percent.

In various embodiments, the boron compound may comprise boron powder (e.g., boron carbide powder). The boron compound comprises particles having an average particle size may be between 100 nanometers (nm) and 100 micrometers (μm) (between $3.9 \times 10^{-6}$ inch and 0.0039 inch), between 500 nm and 100 μm (between 2×10$^{-5}$ inch and 0.0039 inch), between 500 nm and 1 μm (between 2×10$^{-5}$ inch and 3.9×10$^{-5}$ inch), between 1 μm and 50 μm (between 3.9×10$^{-5}$ inch and 0.002 inch), between 1 μm and 20 μm (between 3.9×10$^{-5}$ inch and 0.0008 inch), and/or between 1 μm and 10 μm (between 3.9×10$^{-5}$ inch and 0.0004 inch), about 0.7 μm (2.8×10$^{-5}$ inch), about 9.3 μm (0.0004 inch), and/or about 50 μm (0.0020 inches). As used in this context only, the term "about" means plus or minus ten percent of the associated value.

In various embodiments, the boron compound may comprise particles of varying size. In various embodiments, the boron compound comprises a first group of particles having a first average particle size and a second group of particles having a second average particle size greater than the first average particle size.

In various embodiments, the particles of the first group may have an average particle size between 100 nm and 20 μm (between 3.9×10$^{-6}$ inch and 0.0008 inch), between 500 nm and 10 μm (between 2×10$^{-5}$ inch and 0.0004 inch), between 500 nm and 1.0 μm (2×10$^{-5}$ inch and 3.9×10$^{-5}$ inch), and/or about 0.7 μm (2.8×10$^{-5}$ inch). As used in this context only, the term "about" means plus or minus ten percent of the associated value.

In various embodiments, the particles of the second group may have an average particle size between 500 nm and 60 μm (2×10$^{-5}$ inch and 0.0008 inch), 1 μm and 15 μm (between 2×10$^{-5}$ and 0.0006 inch), between 8 μm and 10.0 μm (between 0.0003 inch and 0.0008 inch), between 45 μm and 55 μm (between 0.0018 inch and 0.0022 inch), about 50 μm (0.0020 inch), and/or about 9.3 μm (0.00039 inch). As used in this context only, the term "about" means plus or minus ten percent of the associated value.

In various embodiments, the boron compound particles of the second average particle size form a larger weight percentage of the boron slurry as compared to the weight percentage formed by the boron compound particles of the first size. In various embodiments, the boron-silicon-glass composite slurry may comprise from 0% to 20% by weight the boron compound first average particle size, 5% to 15% by weight the boron compound first average particle size, and/or about 10.5% by weight the first boron compound average particle size. As used in this context only, the term "about" means plus or minus 0.5% weight percent. In various embodiments, the boron slurry may comprise from 5% to 50% by weight the second boron compound average particle size, 10% to 30% by weight the second boron compound average particle size, 20% to 25% by weight the second boron compound average particle size, and/or about 24.5% by weight the second boron compound average particle size. As used in this context only, the term "about" means plus or minus 0.5% weight percent.

In accordance with various embodiments, the boron slurry includes a glass compound. In various embodiments, the glass compound is a borosilicate glass composition in the form of a glass frit, powder or other suitable pulverized form and comprising SiO$_2$, B$_2$O$_3$, and/or Al$_2$O$_3$. The borosilicate glass may comprise in weight percentage 13% B$_2$O$_3$, 61% SiO$_2$, 2% Al$_2$O$_3$, and 4% Na$_2$O, and may have a CTE of 3.3×10$^{-6}$ cm/Cm, a working point of 2286° F. (1252° C.), and an annealing point of 1040° F. (560° C.). In various embodiments, the glass compound may comprise a lithia potash borosilicate composition in the form of a glass frit, powder or other suitable pulverized form and having a CTE of 3.0×10$^{-6}$ cm/Cm, a working point of 1954° F. (1068° C.), and an annealing temperature of 925° F. (496° C.). In various embodiments, the glass compound may comprises one or more borophosphates, vycor comprised of, in weight percentage. 96% SiO$_2$ and 4% B$_2$O$_3$, quartz, aluminosilicate, boroaluminosilicate, and/or any other suitable glass compound, which may be in the form of a glass frit, powder, or other suitable pulverized form.

The weight percentage of the glass compound within the boron slurry may be any suitable weight percentage for the desired application. In various embodiments, the boron-slurry may comprise from 1% to 35% by weight glass compound, from 5% to 15% by weight glass compound, and/or about 10% by weight glass compound. As used in this context only, the term "about" means plus or minus 0.5 weight percent.

In various embodiments, the glass compound comprises particles, the average particle size may be between 500 nm and 50 μm (between 3.9×10$^{-6}$ inch and 0.0039 inch), between 5 μm and 25 μm (between 2×10$^{-5}$ inch and 0.0039 inch), between 10 μm and 15 μm (between 2×10$^{-5}$ inch and 3.9×10$^{-5}$ inch), between 11.5 μm and 13 μm (between 3.9×10$^{-5}$ inch and 0.002 inch), and/or between about 12.3 μm (0.0004 inch). As used in this context only, the term "about" means plus or minus 0.5 weight percent.

In various embodiments, method 400 further comprises applying the boron slurry to a composite structure (step 404). Applying the boron slurry may comprise, for example, spraying or brushing the boron slurry to an outer surface of the composite structure. In various embodiments, the application of the boron slurry to the composite structure may not comprise CVD, thus saving the significant monetary expense associated with CVD. Any suitable manner of applying the boron-slurry to the composite structure is within the scope of the present disclosure, except in various embodiments, CVD. As referenced herein, the composite structure may refer to a carbon-carbon composite structure. In accordance with various embodiments, the boron slurry may be applied directly on (i.e., in physical contact with) the surface of the composite structure. In this regard, method 400 generally does not include a pretreating composition and/or a pretreating step and/or forming a sealing layer prior to applying the boron slurry or silicon slurry, as may be associated with other oxidation protection systems, for example, oxidation protection systems comprising phosphate glass layers.

In various embodiments, method 400 may further comprise performing a first low temperature bake (step 406). Step 406 may include heating the composite structure at a relatively low temperature (for example, a temperature of about 250° F. (121° C.) to about 350° F. (177° C.), and/or at about 300° F. (149° C.), wherein the term "about" in this context only means plus or minus 25° F. (4° C.)). Step 406 may include heating the composite structure for about 5 minutes to 8 hours, about 10 minutes to 2 hours, and/or about 1 hour, wherein the term "about" in this context only means plus or minus ten percent of the associated value.

In various embodiments, method 400 may comprise forming a silicon slurry (step 408) by combining a silicon compound and a glass compound with a carrier fluid (such as, for example, water). In various embodiments, the silicon compound may comprise silicon carbide, a silicide compound, silicon, and/or silicon carbonitride.

The weight percentage of the silicon compound within the silicon slurry may be any suitable weight percentage for the desired application. In various embodiments, the silicon slurry may comprise from 10% to 70% by weight silicon compound, from 20% to 55% by weight silicon compound, from 40% to 50% by weight silicon compound, and/or about 45% by weight silicon compound. As used in this context only, the term "about" means plus or minus 2 weight percent.

In various embodiments, the silicon compound may comprise a silicon powder (e.g., silicon carbide powder). The silicon compound comprises particles, the silicon compound average particle size may be between 100 nm and 50 μm (between $3.9 \times 10^{-6}$ inch and 0.0039 inch), between 500 nm and 20 μm (between $2 \times 10^{-5}$ inch and 0.0039 inch), between 500 nm and 1.5 μm (between $2 \times 10^{-5}$ inch and $3.9 \times 10^{-5}$ inch), between 15 μm and 20 μm (between $3.9 \times 10^{-5}$ inch and 0.002 inch), about 17 μm (0.0007 inch), and/or about 1.0 μm ($4 \times 10^{-5}$ inch). As used in this context only, the term "about" means plus or minus ten percent of the associated value.

In various embodiments, the silicon compound may comprise silicon compound particles of varying size. In various embodiments, the silicon compound comprises a first group of silicon compound particles having a first average particle size and a second group of silicon compound particles having a second average particle size. The first silicon compound average particle size may be less than the second silicon compound average particle size.

In various embodiments, the silicon compound particles of the first group have an average particle size between 100 nm and 20 μm (between $3.9 \times 10^{-6}$ inch and 0.0008 inch), 500 nm and 10 μm (between $2 \times 10^{-5}$ and 0.0004 inch); between 500 nm and 1.5 μm (between $2 \times 10^{-5}$ and $6 \times 10^{-5}$), and/or about 1.0 μm ($4 \times 10^{-5}$ inch). In various embodiments, the silicon compound particles of the second group may have an average particle size between 1 μm and 50 μm (between $4 \times 10^{-5}$ inch and 0.002 inch), between 5 μm and 25 μm (between 0.0002 inch and 0.001), between 16 μm and 18 μm (between 0.0006 inch and 0.0007 inch), and/or about 17 μm (0.00067 inches). As used in this context only, the term "about" means plus or minus ten percent of the associated value.

In various embodiments, the silicon compound particles of the first average particle size form a larger weight percentage of the boron-silicon-glass composite slurry as compared to the weight percentage formed by the silicon compound particles of the second average particle size. In various embodiments, the silicon slurry may comprise from 0% to 30% by weight the second silicon compound average particle size, 0% to 20% by weight the second silicon compound average particle size, and/or about 13% by weight the second silicon compound average particle size. As used in this context only, the term "about" means plus or minus 1% weight percent. In various embodiments, the silicon slurry may comprise from 5% to 80% by weight the first silicon compound average particle size, 20% to 60% by weight the first silicon compound average particle size, 30% to 50% by weight the first silicon compound average particle size, about 31.5% by weight the second silicon compound average particle size, and/or about 45.0% by weight the second silicon compound average particle size. As used in this context only, the term "about" means plus or minus 1% weight percent.

In various embodiments, the silicon slurry may include a glass compound. The glass compound may comprise a borosilicate glass composition in the form of a glass frit, powder, or other suitable pulverized form. In various embodiments, the borosilicate glass composition may comprise $SiO_2$, $B_2O_3$, and/or $Al_2O_3$. The borosilicate glass may comprise in weight percentage 13% $B_2O_3$, 61% $SiO_2$, 2% $Al_2O_3$, and 4% $Na_2O$, and may have a CTE of $3.3 \times 10^{-5}$ cm/Cm, a working point of 2286° F. (1252° C.), and an annealing point of 1040° F. (560° C.). In various embodiments, the glass compound may comprise a lithia potash borosilicate composition in the form of a glass frit, powder, or other suitable pulverized form and having a CTE of $3.0 \times 10^{-5}$ cm/Cm, a working point of 1954° F. (1068° C.), and an annealing temperature of 925° F. (496° C.). In various embodiments, the glass compound may comprises one or more borophosphates, vycor comprised of, in weight percentage. 96% $SiO_2$ and 4% $B_2O_3$, quartz, aluminosilicate, boroaluminosilicate, and/or any other suitable glass compound, which may be in the form of a glass frit, powder, or other suitable pulverized form.

The weight percentage of the glass compound within the silicon slurry may be any suitable weight percentage for the desired application. In various embodiments, the silicon slurry may comprise from 1% to 35% by weight glass compound, from 5% to 15% by weight glass compound, and/or about 10% by weight glass compound. As used in this context only, the term "about" means plus or minus 0.5 weight percent.

In various embodiments, the glass compound comprises particles, the average particle size may be between 500 nm and 50 μm (between $3.9 \times 10^{-6}$ inch and 0.0039 inch), between 5 μm and 25 μm (between $2 \times 10^{-5}$ inch and 0.0039 inch), between 10 μm and 15 μm (between $2 \times 10^{-5}$ inch and $3.9 \times 10^{-5}$ inch), between 11.5 μm and 13 μm (between $3.9 \times 10^{-5}$ inch and 0.002 inch), and/or between about 12.3 μm (0.0004 inch). As used in this context only, the term "about" means plus or minus 0.5 weight percent.

In various embodiments, method 400 further comprises applying the silicon slurry to a composite structure (step 410). The silicon slurry may be applied over the boron compound of the boron slurry and after the low temperature bake of step 406. In this regard, in various embodiments, the only heat treatment between application of the boron slurry (step 404) and the application of the silicon slurry (step 410) may be the first low temperature bake (step 406). Applying the silicon slurry may comprise, for example, spraying or brushing the boron slurry to an outer surface of the composite structure. In various embodiments, the application of the silicon slurry to the composite structure may not comprise CVD, thus saving the significant monetary expense associated with CVD. Any suitable manner of applying the silicon slurry to the composite structure is within the scope of the present disclosure, except in various embodiments, CVD. As referenced herein, the composite structure may refer to a carbon-carbon composite structure.

In various embodiments, method 400 may further comprise performing a second low temperature bake (step 412). Step 412 may include heating the composite structure at a relatively low temperature (for example, a temperature of about 250° F. (121° C.) to about 350° F. (177° C.), and/or at about 300° F. (149° C.), wherein the term "about" in this context only means plus or minus 25° F. (4° C.)). Step 412 may include heating the composite structure for about 5 minutes to 8 hours, about 10 minutes to 2 hours, and/or about 1 hour, wherein the term "about" in this context only means plus or minus ten percent of the associated value.

In various embodiments, method 400 may further comprise performing a high temperature heat treatment to form the boron layer and the silicon layer on the composite structure (step 414). Step 414 may include heating the composite structure at a relatively high temperature (for example, a temperature of about 1500° F. (816° C.) to about 1700° F. (927° C.), and/or at about 1650° F. (899° C.), wherein the term "about" in this context only means plus or minus 25° F. (4° C.)). Step 414 may include heating the composite structure for about 5 minutes to 8 hours, about 30 minutes to 5 hours, and/or about 2 hour, wherein the term "about" in this context only means plus or minus 0.5 hours. Step 414 is performed after the second low temperature bake (step 412).

During operation, at elevated temperatures (e.g., around 1700° F. (927° C.) or 1800° F. (982° C.)), oxygen may diffuse through, or travel through cracks in the silicon layer of the oxidation protection system and oxidize the boron compound in the boron layer into $B_2O_3$. In various embodiments, in response to temperatures elevating to a sufficient level (e.g., around 1700° F. (927° C.) or 1800° F. (982° C.)), the silicon compound may react (e.g., oxidize) to form silica. The silica may react with the boron trioxide to form borosilicate glass.

The borosilicate glass may be formed in the cracks of the silicon layer. Therefore, the oxidation protection systems described herein have self-healing properties to protect against cracks formed in the layers of the oxidation protection systems, preventing or mitigating against oxygen penetration and the resulting oxidation and loss of material. Additionally, borosilicate glass has a high viscosity (a working point of about 1160° C. (2120° F.), wherein "about" means plus or minus 100° C. (212° F.), and the working point is the point at which a glass is sufficiently soft for the shaping of the glass). Thus, the high temperatures experienced by edges 41, 43 in their proximity to wear surface 33 may cause minimal, if any, migration of the oxidation protection systems described herein.

Exposure of the boron layer to moisture after exposure to increased temperatures (e.g., temperatures greater than 1700° F. (927° C.)), may lead to increased boric acid formation. In accordance with various embodiments, oxidation protection system formed using method 400 may include a boron layer having only larger average particle size boron carbide (e.g., particles about 9.0 µm or greater (0.0004 inch)), and a silicon layer having only smaller average particle size silicon carbide (e.g., particles about 1.0 µm or less ($4 \times 10^{-5}$ inch). Oxidation protection systems having increased percentages of larger average particle size boron carbide (e.g., particles about 9.0 µm or greater (0.0004 inch)) and smaller average particle size silicon carbide (e.g., particles about 1.0 µm or less ($4 \times 10^{-5}$ inch) may reduce formation of boric acid by limiting free boron trioxide by reducing the reaction surface area of boron carbide and increasing the reaction surface area of silicon carbide.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for forming an oxidation protection system on a densified carbon-carbon composite structure, comprising:

applying a boron-silicon-glass composite slurry to the densified carbon-carbon composite structure, wherein the boron-silicon-glass composite slurry comprises a boron compound forming between 20.0% and 25.0% of a weight percentage of the boron-silicon-glass composite slurry, a silicon compound forming between 27.0% and 32.0% of the weight percentage of the boron-silicon-glass composite slurry, a glass compound forming between 5.0% and 25.0% of the weight percentage of the boron-silicon-glass composite slurry, and a carrier fluid, the silicon compound including a first group of silicon compound particles, the boron compound including a first group of boron compound particles, wherein an average particle size of the first group of silicon compound particles is less than a first average particle size of the first group of boron compound particles; and heating the densified carbon-carbon composite structure to a temperature sufficient to remove the carrier fluid and form a boron-silicon-glass layer on the densified carbon-carbon composite structure, wherein the boron-silicon-glass layer forms an exterior surface of the oxidation protection system.

2. Method of claim 1, wherein the boron compound comprises boron carbide and the silicon compound comprises silicon carbide.

3. The method of claim 2, wherein the glass compound comprises borosilicate glass.

4. The method of claim 1, wherein the boron compound comprises the first group of boron compound particles having the first average particle size and a second group of boron compound particles having a second average particle size greater than the first average particle size, and wherein the second group of boron compound particles forms between 14.0% and 20.0% of the weight percentage of the boron-silicon-glass composite slurry and the first group of boron compound particles forms between 5.0% and 8.0% of the weight percentage of the boron-silicon-glass composite slurry.

5. The method of claim 4, wherein the average particle size of the first group of silicon compound particles is less than an average particle size of a second group of silicon compound particles of the silicon compound, and wherein the first group of silicon compound particles forms between 20.0% and 30.0% of the weight percentage of the boron-silicon-glass composite slurry and the second group of silicon compound particles forms between 8.3% and 10.3% of the weight percentage of the boron-silicon-glass composite slurry.

6. The method of claim 5, wherein the average particle size of the first group of silicon compound particles is between 500 nanometers and 1.5 micrometers, wherein the average particle size of the second group of silicon compound particles is between 15 micrometers and 20 micrometers, wherein the first average particle size of the first group of boron compound particles is between 8.0 micrometers and 10 micrometers, and wherein the second average particle size of the second group of boron compound particles is between 500 nanometers and 1.0 micrometers.

7. The method of claim 5, wherein the average particle size of the first group of silicon compound particles is greater than the second average particle size of the second group of boron compound particles, and wherein the average particle size of the second group of silicon compound particles is greater than the first average particle size of the first group of boron compound particles.

8. The method of claim 1, wherein the boron compound comprises at least one of titanium diboride, boron nitride, boron carbide, zirconium boride, silicon hexaboride, or elemental boron, and wherein the silicon compound comprises at least one of silicon carbide, silicon dioxide, a silicide compound, silicon, fumed silica, or silicon carbonitride.

9. The method of claim 1, wherein the average particle size of the first group of silicon compound particles is between 500 nanometer and 1.5 micrometers.

10. The method of claim 9, wherein the first average particle size of the first group of boron compound particles is greater than or equal to 9.0 micrometers.

11. The method of claim 9, wherein the heating the densified carbon-carbon composite structure to the temperature sufficient to remove the carrier fluid and form the boron-silicon-glass layer on the densified carbon-carbon composite structure comprises:
heating the densified carbon-carbon composite structure at a first temperature of about 300° Fahrenheit for between 10 minutes and 1.5 hours; and
heating the densified carbon-carbon composite structure at a second temperature of about 1650° Fahrenheit for between 1.5 hours and 2.5 hours.

12. The method of claim 1, wherein the applying the boron-silicon-glass composite slurry to the densified carbon-carbon composite structure comprises at least one of brushing or spraying, wherein the boron-silicon-glass composite slurry is applied directly on a surface of the densified carbon-carbon composite structure.

13. A method for forming an oxidation protection system on a densified composite structure, comprising:
forming a boron-silicon-glass composite slurry comprising a boron compound forming between 20.0% and 25.0% of a weight percentage of the boron-silicon-glass composite slurry, a silicon compound forming between 27.0% and 32.0% of the weight percentage of the boron-silicon-glass composite slurry, a glass compound, and a carrier fluid, wherein the boron compound comprises boron compound particles having a first average particle size between 8.0 micrometer and 10 micrometers, and wherein the silicon compound includes a silicon compound particles having a second average particle size of between 500.0 nanometers and 1.5 micrometers;
applying the boron-silicon-glass composite slurry to the densified composite structure; and
heating the densified composite structure to a temperature sufficient to form a boron-silicon-glass layer on the densified composite structure.

14. The method of claim 13, wherein the boron-silicon-glass composite slurry comprises about 22.581% by weight of the boron compound, about 29.032% by weight of the silicon compound, about 12.903% by weight of the glass compound, and about 35.484% by weight of the carrier fluid, wherein the first average particle size of the boron compound particles is about 9.3 micrometers, wherein the second average particle size of the silicon compound particles is about 1 micrometers, and wherein an average particle size of the glass compound is about 12.3 micrometers.

15. The method of claim 14, wherein the boron compound comprises boron carbide, and wherein the silicon compound comprises silicon carbide, and wherein the glass compound comprises borosilicate glass, and wherein the boron-silicon-glass layer forms an exterior surface of the oxidation protection system.

16. A method for forming an oxidation protection system on a densified composite structure, comprising:
forming a boron-silicon-glass composite slurry comprising a boron compound, a silicon compound, a glass compound, and a carrier fluid, wherein the boron compound comprises a first group of boron compound particles having a first average particle size and the silicon compound comprises a first group of silicon compound particles having a second average particle size, the second average particle size being less than the first average particle size, wherein the first average particle size of the first group of boron compound particles is about 9.3 micrometers, wherein the second average particle size of the first group of silicon compound particles is about 1 micrometer, wherein the boron compound further comprises a second group of boron compound particles having a third average particle size of about 0.7 micrometers, and wherein the boron-silicon-glass composite slurry comprises about 7.2% by weight boron carbide having the third average particle size of about 0.7 micrometers, about 16.9% by weight boron carbide having the first average particle size of about 9.3 micrometers, about 9.3% by weight silicon carbide having a fourth average particle size of about 17 micrometers, about 21.7% by weight silicon carbide having the second average particle size of about 1 micrometers, about 6.9% by weight borosilicate glass having a fifth average particle size of about 12.3 micrometers, and about 37.9% by weight carrier fluid;
applying the boron-silicon-glass composite slurry to the densified composite structure; and
heating the densified composite structure to a temperature sufficient to form a boron-silicon-glass layer on the densified composite structure, wherein the boron-silicon-glass layer forms an exterior surface of the oxidation protection system.

17. The method of claim 16, wherein the silicon compound further includes a second group of silicon compound particles having a third average particle size between 15 micrometers and 20 micrometers, and wherein the first group of silicon compound particles forms a greater weight percentage of the boron-silicon-glass composite slurry than the second group of silicon compound particles.

18. The method of claim 16, wherein the boron compound comprises boron carbide, and wherein the silicon compound comprises silicon carbide, and wherein the glass compound comprises borosilicate glass.

* * * * *